United States Patent
Scrymgeour et al.

(10) Patent No.: US 9,168,767 B2
(45) Date of Patent: Oct. 27, 2015

(54) PRINTING OF GAME TICKETS

(75) Inventors: Lyle Scrymgeour, Oakbank (CA); Michael John Brickwood, Winnipeg (CA); Andrew Wojtowicz, Winnipeg (CA)

(73) Assignee: Pollard Banknote Limited Partnership, Winniped, MB (CA)

( * ) Notice: Subject to any disclaimer, the term of this patent is extended or adjusted under 35 U.S.C. 154(b) by 609 days.

(21) Appl. No.: 13/314,898

(22) Filed: Dec. 8, 2011

(65) Prior Publication Data

US 2012/0145024 A1    Jun. 14, 2012

Related U.S. Application Data (60) Provisional application No. 61/422,830, filed on Dec. 14, 2010.

(51) Int. Cl.
A63F 3/06 (2006.01)
B41J 11/00 (2006.01)
B41J 3/407 (2006.01)

(52) U.S. Cl.
CPC ............ B41J 11/008 (2013.01); A63F 3/0655 (2013.01); A63F 3/0665 (2013.01); B41J 3/4075 (2013.01); G06K 2215/0082 (2013.01)

(58) Field of Classification Search
CPC ............... A63F 3/0655; A63F 3/0665; A63F 2003/066; A63F 2003/067; A63F 2003/0675
USPC .................. 273/139; 283/901, 903; 101/483; 400/76
See application file for complete search history.

(56) References Cited

U.S. PATENT DOCUMENTS

| | | | |
|---|---|---|---|
| 5,569,512 A | 10/1996 | Brawner et al. | |
| 5,704,647 A | 1/1998 | Desbiens | |
| 5,769,458 A * | 6/1998 | Carides et al. | 283/102 |
| 5,788,237 A * | 8/1998 | Fults et al. | 273/269 |
| 6,145,885 A | 11/2000 | Scrymgeour et al. | |
| 6,234,477 B1 | 5/2001 | Scrymgeour et al. | |
| 6,347,794 B2 | 2/2002 | Scrymgeour et al. | |
| 2008/0106034 A1* | 5/2008 | Knapp | 273/139 |
| 2008/0141886 A1* | 6/2008 | Whitelaw et al. | 101/484 |
| 2008/0197621 A1 | 8/2008 | Grotkowski | |
| 2009/0186680 A1* | 7/2009 | Napolitano et al. | 463/17 |
| 2009/0287580 A1* | 11/2009 | Irwin, Jr. | 705/21 |
| 2010/0253063 A1 | 10/2010 | Skogster | |

FOREIGN PATENT DOCUMENTS

| CA | 2607766 | 6/2008 |
|---|---|---|
| CA | 2666784 | 12/2009 |

* cited by examiner

*Primary Examiner* — Blake A Tankersley
(74) *Attorney, Agent, or Firm* — Adrian D. Battison; Ade & Company Inc.

(57) ABSTRACT

In a row of lottery tickets each ticket has variable image printing game data printed onto a base layer on a substrate and a series of covering layers including at least one sealing layer and at least one scratch-off layer. Simultaneously game information is printed as a multi-color digital image for each ticket using a variable image printing system. The game information graphics can indicate different values for different ones of the tickets. The tickets in the row can be of different series for sale to different retailers. The printing system automatically correlates the game data and game information to ensure no registration errors thus allowing much improved variability and allowing the game to take into account both game data and game information in determining a winning ticket.

19 Claims, 4 Drawing Sheets

PRINTING OF GAME TICKETS

This application claims the benefit under 35 USC 119 of Provisional Application 61/422,830 filed Dec. 14, 2010.

This invention relates to the printing of game tickets which include a ticket substrate having a front surface, game information printed on the front surface of the ticket substrate, a game area defined on the front surface and game play data printed on the front surface in the game area where the game play data is covered by at least one covering scratch-off layer which can be removed to be exposed by a player.

BACKGROUND OF THE INVENTION

Game tickets such as lottery tickets commonly include a substrate on which is printed game data in a game play area which is then covered by a coating of a scratch-off material to allow the player to reveal the game data or selected parts of the game data to play the game. An important aspect of such tickets is that of providing an attractive and aesthetic appearance which acts to attract the customer to purchase. Typically such tickets have an overprint layer applied onto the scratch-off coating so as to identify the areas to be scratched and to provide an attractive appearance, bearing in mind that the majority of the area of the front of the ticket is taken up by the game area. While the material printed is relative simple in most cases, attempts have been made to make the ticket more attractive by applying more complex images onto the game area.

In U.S. Pat. No. 5,569,512 (Brawner, Jon M) assigned to Dittler Brothers and entitled Card with integrated overprinting is disclosed lottery tickets which utilize continuous overprint inks that mask the boundaries between their "secure" and "unsecure" portions to inhibit unscrupulous players from successfully tampering with them. The method uses reformulated overprint inks to permit a single set to be applied to both portions of a card. The method is stated to have the advantages that more vibrant and aesthetically pleasing graphics may be displayed as well while utilizing fewer printing stations during the printing process.

In U.S. Pat. No. 5,704,647 (Desbiens, Jean-Pierre) assigned to BABN Technologies Corporation and entitled Multi-color overprinting of scratch-off lottery tickets there is disclosed a method of producing a lottery ticket and lottery tickets produced thereby wherein an overprinting layer is provided over a scratch-off layer, the overprinting layer comprising an image obtained from a design in which the colors in the design have been separated into half tone images of each color and are superimposed on the scratch-off layer of the lottery ticket.

Lottery tickets are printed at high speed using printing rollers for the repeated sections of the tickets such as the basic graphics, the security and base layers, the covering layers of varnish and the like, the scratch-off coating and the overprint layer. The game data are printed on the ticket generally using an ink jet printer controlled by a computer to apply the different game data for each of the tickets. The game data generally also includes an identifying bar code (or machine readable code) which again is unique to the ticket concerned. The game data are generally relatively simple often being merely numbers or letters which can be readily printed by the ink jet printer. Thus the overprint images are printed using the conventional printing press which includes a printing roller for each of the different colors. The printing roller system is used because it provides the high speeds necessary for commercial production of such tickets and because it applies inks which can be selected to ensure proper coverage over the underlying material regardless of its characteristics.

In Published US application 2008/0197621 (Grotkowski) published Aug. 21, 2008 and assigned to the present Assignee, which corresponds to Canadian application 2607766 published Jun. 19, 2008 is disclosed a row of lottery tickets of the above general type in which a multi-color digital image for each ticket is printed onto the scratch-off layer using a variable image printing system. At least part of the scratch-off layer can be left free from printed overlay graphics and the multi-color digital image can be printed subsequently at a different location from the ticket manufacturing location. The graphics can indicate different values for different ones of the tickets. The tickets in the row can be of different lengths and the graphics can be different for different length ones of the tickets.

In Published US application 2010/0253063 (Skogster) published Oct. 7, 2010 and assigned to Black and White Paper Mfg AB, which corresponds to PCT published 2009/062297 published May 22, 2009 is disclosed a scratch-off instant game card of the above general type having a secure area for the game data with the game data printed as full colour variable images printed on the secure area. The arrangement disclosed provides one pass printing where the graphics on the ticket surrounding the secure area and the game data on the secure area are printed simultaneously. The application points out that this provides advantages in regard to the appearance of the ticket in that the game data is now a full color image.

Canadian application 2666784 (Grotkowski) published Dec. 2, 2009 discloses a similar arrangement where the game data elements are printed in a game area with a four color design.

Printing techniques are disclosed in prior US patents of the present assignee, as follows:

U.S. Pat. No. 6,145,885 issued Nov. 14, 2000;
U.S. Pat. No. 6,234,477 issued May 22, 2001; and
U.S. Pat. No. 6,347,794 issued Feb. 19, 2002.

The disclosures of each of the above documents is hereby incorporated herein by reference in as much as they disclose printing techniques and lottery ticket constructions that may be incorporated or used herein.

Traditionally instant tickets are manufactured in a segmented (roll to roll) process which involves multiple steps, run independent of each other. The steps are as follows Base graphics including the game information;
Lilypad(s) defining the game play area;
Variable game data;
Protective/release coatings, scratchoff layer and overprint layer.

More recently production is carried out in an in-line environment in which all of the above steps are performed in a single pass through one press, although the variable game data is applied separately from the graphical portions of the ticket including the game information.

Costs are often incurred to re-manufacture product because of errors which occurred and were not noticed during the production process. The incidences can be very low but the costs are high because, even if a very small percentage of tickets in a production run are non-conforming but not identified during production are released into the marketplace, the customer has the ability to reject the entire game and demand it be reproduced.

One such example is a game entitled Heads or Tails. In the segmented manufacture of this product, base graphics consist of a picture of a coin's head or tail and are printed on an offset press. The variable imaged data consists of a head or tail and are printed on an ink jet imager. In this case the variable data is a black image of a coin which is shown as being either a head or a tail. To win, the image on the coin in the game area has to match the image of the coin in the graphic area. A loser reveals a mismatch. The consequences are significant if the images in the game data area are not synchronized properly. There is a financial loss as well as loss of integrity in the marketplace.

Existing imaging technology used in the lottery industry has been based on the use of multiple imaging heads. Each imaging head is designed to support 1 colour (typically black) which covers a portion of the web. Each head is approximately 4" wide and it requires 5 heads to image a 20" wide web. To add a single colour, other than black, in each row of tickets requires an additional 5 heads. Alternatively some of the black heads could be drained and converted to red however this reduces the run width to 2 rows of tickets instead of 5. This is a very expensive alternative and still limits the process to a single additional colour. A further risk is created when trying to run 2 colours (black and one other) on a single ticket as these must be applied in separate printing units.

Multiple checks, production and post-production, manual and machine-based have been developed to enable us to check for the synchronization of the data but the risk remains of an out of sync situation occurring as these checks are subject to errors.

SUMMARY OF THE INVENTION

It is one object of the invention to provide an improved method of printing game tickets.

According to a first aspect of the invention there is provided a method of printing a row of game tickets where the tickets define:

a ticket substrate having a front surface;

game information printed on the front surface of the ticket substrate;

a game area defined on the front surface;

game play data printed on the front surface in the game area;

the game play data being covered by a scratch-off layer which can be removed to be exposed by a player;

the method comprising:

providing a substrate in a continuous strip;

running the continuous strip through a printing line;

on the printing line, printing onto the substrate in the continuous strip for each ticket of the row of tickets the game play data using a variable image printing system so that the game play data of each ticket is different from the game play data of at least some other tickets in the row;

on the printing line, printing onto the substrate in the continuous strip for each ticket of the row of tickets the game information using a variable image printing system so that the game information of each ticket is different from the game information of at least some other tickets in the row;

wherein the game information and the game play data on the tickets are varied such that the game information and the game play data on each ticket are related;

and controlling the variable image printing of the game information and the game play data of the tickets by a common control system of the printing line so that the game information and the game play data of each ticket are automatically correlated by the common control system.

This arrangement avoids registration problems of correlation between game data and graphics.

Preferably the game information and the game play data on each ticket are related such that a winning and losing status of the ticket is determined by using both data taken from the game play data of the ticket, which varies relative to other tickets, and data taken from the game information of the ticket, which varies relative to other tickets.

Preferably the game information and the game play data on each ticket are related by a common theme.

Preferably a series of tickets is printed where the game information of each ticket of the series is different with the different game information related by a common theme.

Preferably a sequential series of the tickets is printed where each of the tickets of the series have the game information thereof tied together as a sequential theme.

Preferably the theme is a series of numbers.

Preferably the sequential series of the tickets each have also the game play data thereof tied together as a sequential theme.

Preferably the game information and the game play data form two separate distinct images with a discernible line therebetween;

Preferably the method includes controlling the variable image printing of the game information and the game play data of the tickets by a common control system of the printing line so that there is no space between the image forming the game play data and the image forming the game information.

Preferably the simultaneous printing of the game data and the graphics allows the jitter space between the game data and graphics to be omitted.

Preferably the reduction in the jitter space is used to increase the jitter of the game data elements.

Preferably the reduction in the jitter space is used to allow more game data per area on the ticket.

Preferably the game data is printed not in full color.

Preferably the game information is printed in full color.

Preferably the game data uses the concept of color of the game data or a part thereof as a bonus win.

Preferably the game data and the game information is printed simultaneously.

Preferably the multi-color image of the game information of each ticket is different from that of the next adjacent tickets.

Preferably the game data is printed as a multi-colored image which cover all of the play area of each ticket.

Preferably the variable image printing system is inline with the printing of the covering layers.

Preferably the game information relates to the game of heads and tails where the game information is arranged such that a winning and losing status of the ticket is determined by using both data taken from the game play data of the ticket and data taken from the game information of the ticket.

Preferably the game play data is printed into a secure game area and includes benday lines printed between individual game elements of the game play data and wherein the benday lines of each ticket are different from the benday lines of at least some other tickets in the row differences therebetween are not repeated in a discernible pattern.

Preferably the tickets are printed in a series relating to a single game and wherein the game information of some of the tickets is varied relative to the game information of others of the tickets so as to generate at least two separate series of tickets of the same game.

Preferably the different series relate to different retailers.

Preferably the different series relate to different locations.

Preferably the different series allow the game to create a short run of tickets using the same game also used on other runs.

According to a second aspect of the invention there is provided a method of printing a row of game tickets where the tickets define:

a ticket substrate having a front surface;

game information printed on the front surface of the ticket substrate;

a game area defined on the front surface;

game play data printed on the front surface in the game area;

the game play data being covered by a scratch-off layer which can be removed to be exposed by a player;

the method comprising:

providing a substrate in a continuous strip;

running the continuous strip through a printing line;

on the printing line, printing onto the substrate in the continuous strip for each ticket of the row of tickets the game play data using a variable image printing system so that the game play data of each ticket is different from the game play data of at least some other tickets in the row;

on the printing line, printing onto the substrate in the continuous strip for each ticket of the row of tickets the game information using a variable image printing system so that the game information of each ticket is different from the game information of at feast some other tickets in the row;

wherein on each ticket the game play data is related to the game information by a common theme;

wherein a sequential series of the tickets each have the game information thereof tied together as a sequential theme.

Preferably the theme is a series of numbers.

Preferably the sequential series of the tickets each have also the game play data thereof tied together as a sequential theme.

According to a third aspect of the invention there is provided a method of printing a row of game tickets where the tickets define:

a ticket substrate having a front surface;

game information printed on the front surface of the ticket substrate;

a game area defined on the front surface;

game play data printed on the front surface in the game area;

the game play data being covered by a scratch-off layer which can be removed to be exposed by a player;

the method comprising:

providing a substrate in a continuous strip;

running the continuous strip through a printing line;

on the printing line, printing onto the substrate in the continuous strip for each ticket of the row of tickets the game play data using a variable image printing system so that the game play data of each ticket is different from the game play data of at least some other tickets in the row;

on the printing line, printing onto the substrate in the continuous strip for each ticket of the row of tickets the game information using a variable image printing system;

wherein the game play data is printed into a secure game area and includes benday lines printed between individual game elements of the game play data and wherein the benday lines of each ticket are different from the benday lines of at least some other tickets in the row differences therebetween are not repeated in a discernible pattern.

According to a fourth aspect of the invention there is provided a method of printing a row of game tickets where the tickets define:

a ticket substrate having a front surface;

game information printed on the front surface of the ticket substrate;

a game area defined on the front surface;

game play data printed on the front surface in the game area;

the game play data being covered by a scratch-off layer which can be removed to be exposed by a player;

the method comprising:

providing a substrate in a continuous strip;

running the continuous strip through a printing line;

on the printing line, printing onto the substrate in the continuous strip for each ticket of the row of tickets the game play data using a variable image printing system so that the game play data of each ticket is different from the game play data of at least some other tickets in the row;

on the printing line, printing onto the substrate in the continuous strip for each ticket of the row of tickets the game information using a variable image printing system so that the game information of each ticket is different from the game information of at least some other tickets in the row;

wherein the game information and the game play data form two separate distinct images with a discernible line therebetween;

and controlling the variable image printing of the game information and the game play data of the tickets by a common control system of the printing line so that there is no space between the image forming the game play data and the image forming the game information.

That is the simultaneous printing of the game data and the graphics allows the jitter space between the game data and graphics to be omitted. This relates to a situation where the game data and graphics are not the same image but are independent of one another with a clear distinction. This reduction in the space allows an increase in the jitter of the game data elements for pin pricking and/or allows more game data per area on the ticket.

According to a fifth aspect of the invention there is provided a method of printing a row of game tickets where the tickets define:

a ticket substrate having a front surface;

game information printed on the front surface of the ticket substrate;

a game area defined on the front surface;

game play data printed on the front surface in the game area;

the game play data being covered by a scratch-off layer which can be removed to be exposed by a player;

the method comprising:

providing a substrate in a continuous strip;

running the continuous strip through a printing line;

on the printing line, printing onto the substrate in the continuous strip for each ticket of the row of tickets the game play data using a variable image printing system so that the game play data of each ticket is different from the game play data of at least some other tickets in the row;

on the printing line, printing onto the substrate in the continuous strip for each ticket of the row of tickets the game information using a variable image printing system so that the game information of each ticket is different from the game information of at least some other tickets in the row;

wherein the tickets are printed in a series relating to a single game and wherein the game information of some of the tickets is varied relative to the game information of others of the tickets so as to generate at least two separate series of tickets of the same game.

Preferably the different series relate to different retailers.

Preferably the different series relate to different locations.

Preferably the different series allow the game to create a short run of tickets using the same game also used on other runs.

This relates to a situation where for example different groups want sets of tickets customized to identify that group, such as individual retailers, or locations, who want a series of tickets marked with their logos etc but do not want to purchase a whole game. In many cases the game data will relate to the same group. Such as a specific retailer or store chain who will have their logo on the tickets and prizes related to their products.

According to a sixth aspect of the invention there is provided a method of printing a row of game tickets where the tickets define:

a ticket substrate having a front surface;

game information printed on the front surface of the ticket substrate;

a game area defined on the front surface;

game play data printed on the front surface in the game area;

the game play data being covered by a scratch-off layer which can be removed to be exposed by a player;

the method comprising:

providing a substrate in a continuous strip;

running the continuous strip through a printing line;

on the printing line, printing onto the substrate in the continuous strip for each ticket of the row of tickets the game play data using a variable image printing system not in full color so that the game play data of each ticket is different from the game play data of at least some other tickets in the row;

on the printing line, printing onto the substrate in the continuous strip for each ticket of the row of tickets the game information using a variable image printing system in full color so that the game information of each ticket is different from the game information of at least some other tickets in the row.

The game provided on each ticket may be for prizes both monetary and product related or may be merely for entertainment where no gambling or prize is involved. The type and value of any prizes can vary widely.

The games concerned are preferably instant win type games where the result is entirely predetermined, since such games are generally preferred in a lottery situation in order to ensure that the total winnings is predetermined. However the present invention is not limited to the type of game to be played and can include probability or other games which include game indicia covered by a scratch-off coating.

The construction may also be used in situations where the main objective is for other purposes than gambling such as in promotional games or games of fun for children or others where no gambling or prizes are involved.

Many such tickets are used directly in a lottery situation so that the tickets have no other relevance other than the playing of the lottery or game by which the player may win monetary or other prizes as part of the lottery or gaming situation.

However more attention has been recently given to the use of such tickets as promotional items used by manufacturers of other products to enhance the sale of the product.

The arrangement described hereinafter can provide a significant advancement in lottery production and reduction of risk in which it is possible to variably image the graphical elements of the base graphics, that is the game information, at the same time as the variable game data is being applied. This provides a number of important advantages:

1) Synchronization of base to variable imaged graphics enables synchronization of data accurately on every ticket as it is being produced without requirements for production and post-production monitoring.

2) Ability to run multiple game formats and accompanying graphics within a single book of tickets.

3) Ability to enhance game data elements by utilization of coloured symbols which correspond to the ticket itself. For example a ticket could be produced which features varying data colours depending on the game play format. A book could contain tickets with 1-10 in the graphics of which each one has a different theme. Red Not 7's features red play data, 8 Ball is black, Icy 3's is blue, etc. These are produced without the need for additional hardware, additional make-ready times or restriction in the number of tickets being produced at one time.

4) Benday lines which are added in the game play area in attempt to deter some forms of attempted compromise including "cut & paste". A "cut & paste" is done by transferring one or more symbols from 1 ticket to another to form an apparent winner. Benday lines deter this type of action by making it more difficult to match the background behind the data. Benday lines however have limited effectiveness because the same pattern is repeated every rotation of the printing press. Fraudsters quickly realize that when looking for tickets with the same pattern they need only to count down the row. Variable imaging the benday lines in multiple colours virtually eliminates the ability for a fraudster to locate a matching pattern. Further different patterns (ie. Bulls-eye vs concentric circles) can also be added to the same game making the determination of a match even more challenging.

5) Imaging graphics and play data simultaneously significantly reduces printing traps and other such print allowances and tolerances resulting in tighter and more exact registration of graphical elements. Reduction of these trap allowances creates more useable real estate on the ticket for enhancements such as larger graphical features or increased security (game data bounce).

6) Ability to regionalize the marketing of instant lottery products within a state, based on human demographics (ethnic groups, rural versus urban, etc.), specific regional areas within the state/province/country or regional landmarks. Lotteries could market the same game, with regional differences, to various areas, interest groups, etc. within the lottery jurisdiction.

7) Ability to produce and market common games to multiple lottery jurisdictions which features specific differences including graphic details, prize structure, etc. designed to distinguish one from the other. Lotteries are continually looking for ways to reduce the costs of tickets in order to maximize the return to the government and/or the charitable organizations that are supported by lottery funding. The use of simultaneous imaging of the base graphics and variable data enables common games to be offered to various lottery organizations which feature the information related to the specific state or province that each participant wants to ensure that the tickets can be easily identified between adjacent lotteries. These games do not have to be run consecutively or sequentially but can be marketed and produced separately without loss of the financial gains achieved or the need to incur the costs associated with traditional game start-up.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

A book 100 of lottery tickets 11 includes a plurality of the lottery tickets 11 in a row which is commonly fan folded as shown at 12.

The tickets are formed from a ticket substrate 13 supplied to the printer in a roll 16. This substrate 13 can be a card stock only or may be of a card stock 13A on which is applied a foil layer 14 covering the front surface.

Figure 1:
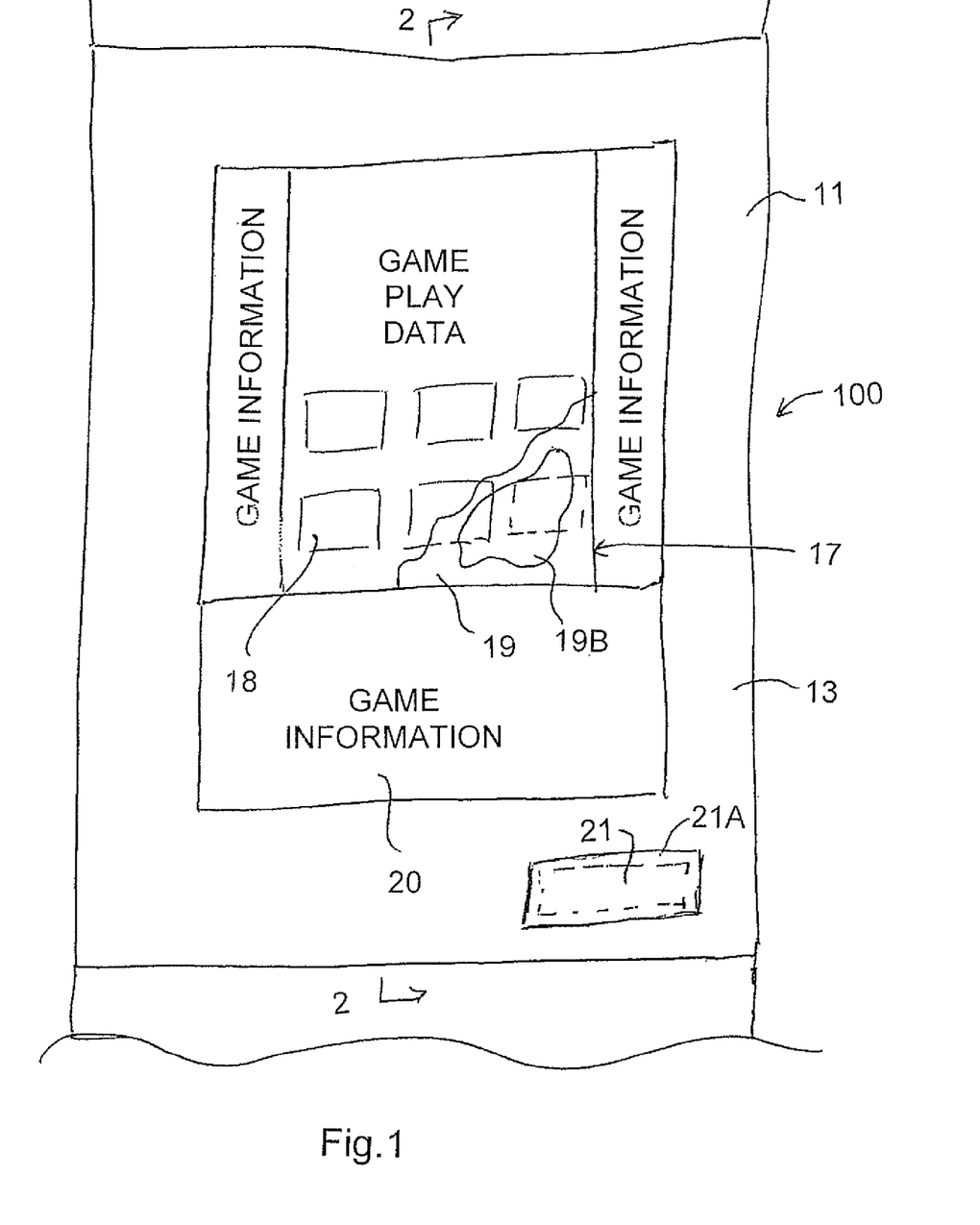
FIG. 1 is a front elevational view of a row of tickets according to the present invention showing in particular a single ticket of the row.

On the substrate 13 of the single ticket of FIG. 1 is printed a game area 17 defined on the ticket substrate by a base layer 17A and indicia defining game data 18 is printed over the ticket substrate in the game area onto the base layer 17A in the form of a white lily pad, which is printed onto the ticket substrate and formed from a series of security layers well known in the art.

Figure 2:
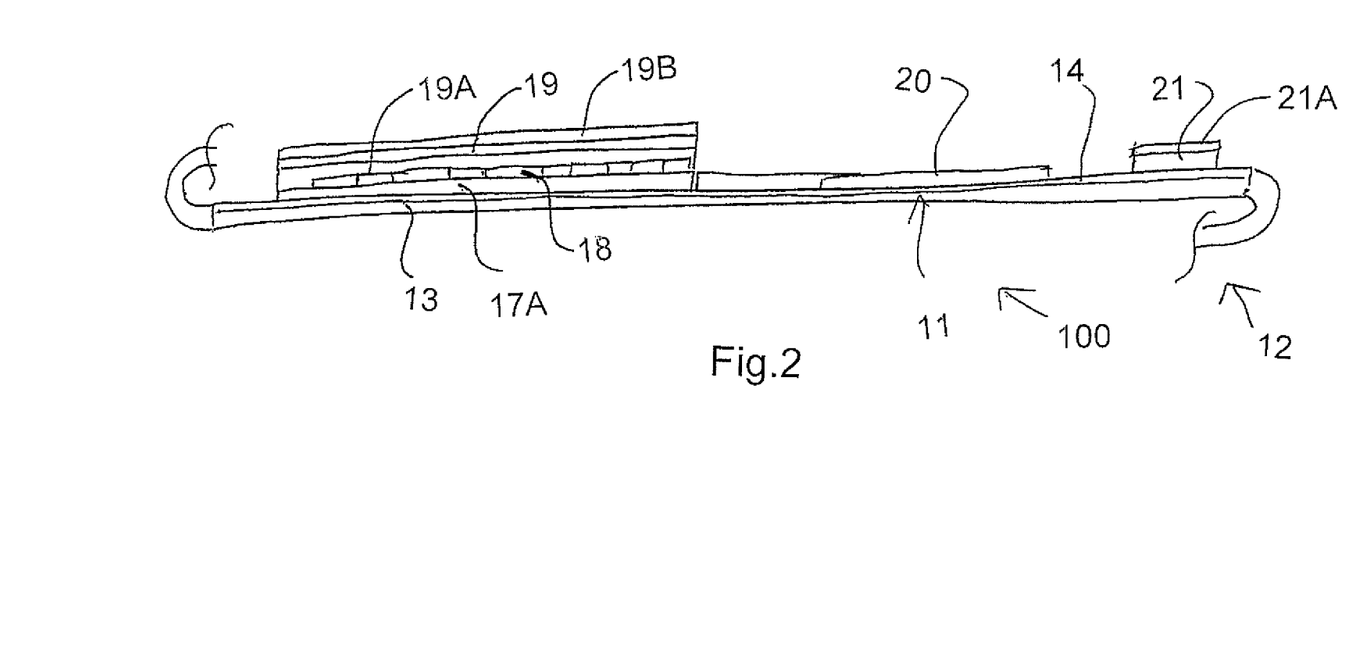
FIG. 2 is a cross-sectional view along the lines 2-2 of FIG. 1.

At least one fixing layer 19A is applied over the game data in the game area which is arranged to prevent release of the printed game data from the substrate layer and at least one opaque scratch-off layer 19 is applied over the sealing layer, the scratch-off layer being arranged such that it separates from the sealing layer and breaks down into fragments when scratched by a player. The ticket also may have a printed layer 19B over the scratch-off layer.

In addition to the game data 18 in the game area 17, the ticket has printed onto the front face over the ticket substrate various game information 20 and a bar code or security code 21 which may be covered by scratchoff layer 21A.

Figure 4:
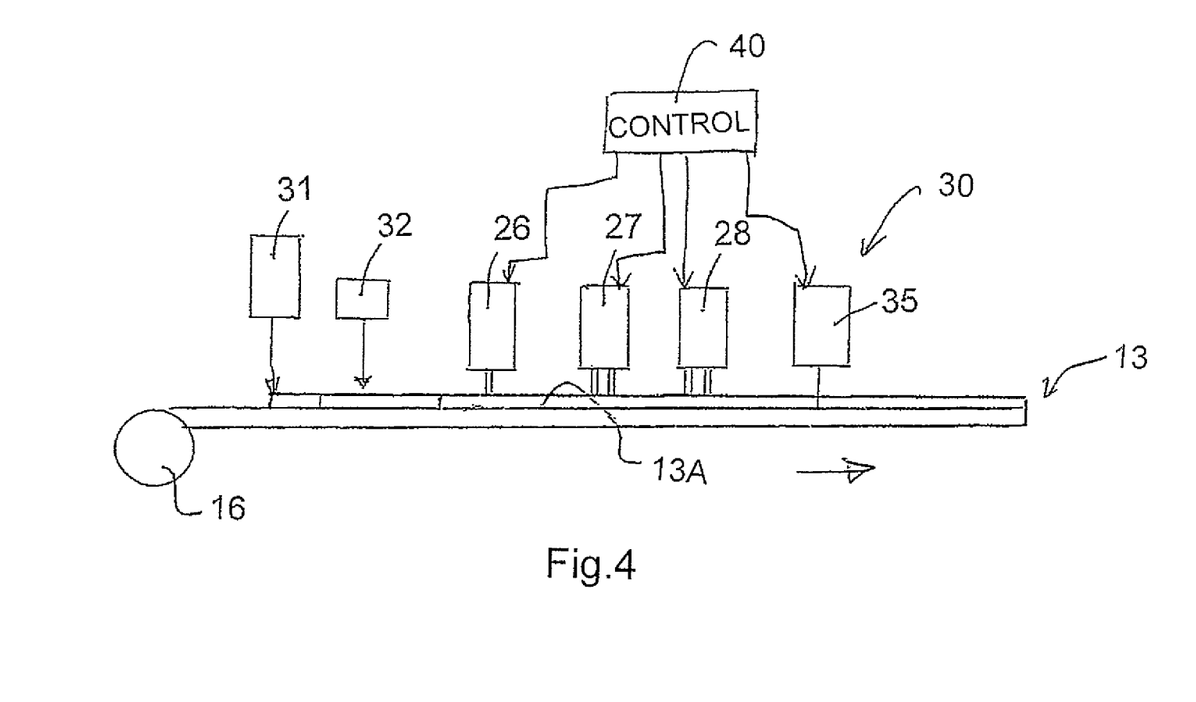
FIG. 4 is a schematic side elevational view of a method of manufacturing the tickets of FIG. 1.

The method of printing the row of the lottery tickets is shown in FIG. 4. During the printing, the ticket substrate 13 is supplied in a continuous strip having a front surface 13A. An in line printing process is provided including stations 31 and 32 of the required security layers and lily pad 17A of a conventional nature. The in line process further includes a variable image printing system 30 including printing heads 26, 27 and 28 which are inline with the printing at station 35 of the covering layers 19, 19A and 19B.

The game data and game information identified above are printed onto the ticket substrate using printing heads 26, 27, 28 which provide variable image printing commonly using ink jet processes in single color or multicolour processes. Typically the number of different color printing heads is four which are magenta cyan, yellow and black. The three heads 26, 27, 28 are shown merely schematically and are not intended to indicate a specific number of printing heads which can of course vary.

On the printing line, the game data are printed onto the substrate in the continuous strip for each ticket of the row of tickets, where the game play data is formed by a variable image printing system 26, 27, 28 so that the game play data of each ticket is different from the game play data of at least some other tickets in the row.

On the printing line, the game information is printed onto the substrate in the continuous strip for each ticket of the row of tickets the game information formed by a variable image printing system 26, 27, 28 so that the game information of each ticket is different from the game information of at least some other tickets in the row.

The game information and the game play data on the tickets are varied such that the game information and the game play data on each ticket are related.

The variable image printing of the game information and the game play data of the tickets by a common control system 40 of the printing line 30 so that the game information and the game play data of each ticket are automatically correlated by the common control system.

As described above in relation to the game heads and tails, the game information 20 and the game play data 18 on each ticket are related such that a winning and losing status of the ticket is determined by using both data taken from the game play data of the ticket, which varies relative to other tickets, and data taken from the game information of the ticket, which varies relative to other tickets. The game information and the game play data on each ticket are related by a common theme.

Figure 3:
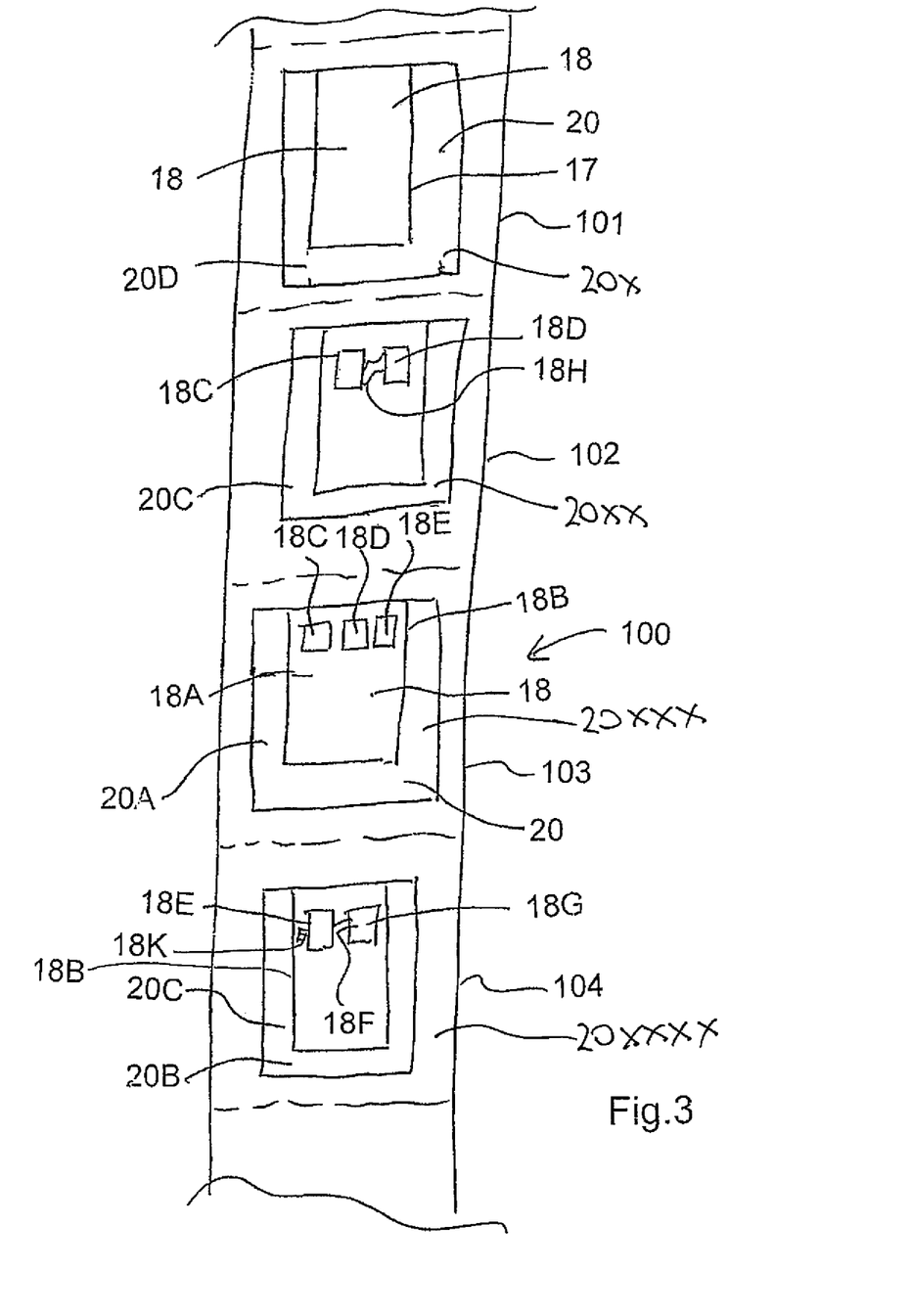
FIG. 3 is a front elevational view of the row of tickets of FIG. 1.

As shown in FIG. 3, a series 100 of tickets 101 to 104 etc is printed where the game information 20 of each ticket of the series is different from that of the next as indicated on ticket 101 at 20X, on ticket 102 at 20XX, on ticket 103 at 20XXX, and on ticket 104 at 20XXXX, with the different game information related by a common theme X, for example the theme of numbers as described above. That is a sequential series of the tickets 101 to 104 is printed where each of the tickets of the series has the game information thereof tied together as a sequential theme of X, XX, XXX and XXXX. Also in the sequential series of the tickets each have also the game play data 18 thereof tied together as a sequential theme.

Another example of this may be the Fetiche game or Numbers game where the player removes the scratchoff layer to reveal three play spots. If any of the numeric symbols match the game information, the player wins the corresponding prize amount. Coloured imaging of the game data allows the ticket to offer a multiplier incentive. For example, if the play data matches the game information and is the same colour as the background, the prize amount is doubled.

As shown schematically in FIG. 3 at ticket 103, the game information and the game play data form two separate distinct images 18A and 20A with a discernible line 18B therebetween. The control system 40 is arranged to effect controlling the variable image printing of the game information 20 and the game play data 18 of the tickets by of the printing line so that there is no space at 18B between the image 18A forming the game play data and the image 20A forming the game information.

Jitter space is required when printing separate data such as data 18A and 20A to prevent the possibility of over printing of the edge of one component with the edge of the other component since this overprinting is sufficiently unsightly that it cannot be tolerated. Thus a space must be provided between two separate components of the printing to provide sufficient jitter for any misalignment which can occur between the substrate and the printing head, bearing in mind that exact registration in position is typically not possible. The concept of jitter space is of course well known to persons skilled in this art.

In the present invention, the simultaneous printing of the game data 18A and the graphics 20A allows the conventional required jitter space between the game data and graphics to be omitted so that there is no space. The reduction in the jitter space at the edge 18B is used to increase the jitter of the game data elements 18C, 18D and 18E relative to one another and relative to the edge 18B of the game data space 18. Jitter of the game data elements, that is the specific location of each data element is moved for different tickets, is provided in tickets in order that the fraudster has more difficulty locating the individual game elements for a pin-pricking attack.

As shown in FIG. 3 a space 18K is provided between the game data element 18E and the edge 18B the of play area 18. This space is typically referred to as a quiet zone and allows for press to press (offset to imager, imager to flexo) tolerances. These quiet spaces may be reduced significantly in the following areas:

elimination of print traps, front and back. Current trap allowances are 31.5 pts for back printing and 21.25 pts for front printing, elimination of clock marks (registration markings printed on the ticket front in the book and ticket area) typically 3.5 pts, elimination of colour to colour traps. These traps are designed into the tickets to make allowances for colour to colour mechanical variations and are typically 2 pts, reduction in the quiet space of imaged game data to edge of play area from 3.5 pts to 1.5 pts.

Alternatively or in addition, the reduction in the jitter space or the direct alignment of the game data and the game information at the line 18B is used to allow more game data elements per area on the ticket.

Reduction of this space would allow for the following to be utilized in the same game data space:

1) additional retailer check letter positions,
2) additional validation number positions,
3) increase in the size of legends,
4) more accurate registration of imaged game data to legends.

Typically the game data, that is the game data elements 18C, 18D and 18E are printed not in full color whereas the game information 20 is printed in full color. That is the advantages obtained in this invention do not relate to the use of full color printing for the game data and these can be of single color or block color construction.

However the simultaneous printing and guaranteed registration obtained by the simultaneous printing allows the game data to use the concept of color of the game data or a part thereof as a bonus win. That is, if the game data is printed in full color, it has many different colors and shades throughout. The use of a single color for the game data but where different colors are used on different tickets allows the color of the game data to provide another aspect of the play so that not only the individual game elements themselves but also their color can be used in addition to determine a winning status of the ticket, or more particularly the color can provide a bonus win if it matches a predetermined color requirement set out in the game information 20.

Previously some games have been offered where the colour of the game symbol results in a bonus win, for example, find a red 7 and win double. The ability to image up to full colour game symbols allows the possibility to greatly expand on this style.

For example a game could have a range of bonuses for different colours such as red=2X, blue=4X, etc. Alternately the bonus could be based on the colour of a graphical feature on the ticket. For example, if the background on the ticket is blue and you have a winning combination in which one of the symbols is blue then there would be a bonus win. Another option would be to find a combination of colours. For example on tickets relating to sports team franchises, a winning combination which included a particularly team color combination could win a bonus prize.

The use of the variable image printing of the game information 20 allows the multi-color image of the game information 20 of each ticket to be different as at 20A from that of the next adjacent tickets at 20B and 20C. While game data can be of the conventional limited color types typically used, the game data 18A can be printed as a multi-colored image which covers all of the play area of each ticket 17.

As described above, the game can be of a nature where the game information relates to the game of heads and tails where the game information is arranged such that a winning and losing status of the ticket is determined by using both data taken from the game play data of the ticket and data taken from the game information of the ticket.

The game data 18 is printed into the secure game area 17 and includes benday lines 18F printed between individual game elements 18C and 18D of the game play data and the benday lines of each ticket such as tickets 103 are different from the benday lines 18H between the game elements 18E AND 18G of at least some other tickets such as ticket 104 in the row where the differences therebetween are not repeated in a discernible pattern.

As shown in FIG. 4 the tickets are printed in a series 100 relating to a single game as defined by the type of game selected and the ticket information and ticket identifying numbers printed onto each ticket. The game information 20A, 20B of some of the tickets 103, 104 is varied relative to the game information 20C, 20D of others of the tickets 101, 102 so as to generate at least two separate series of tickets of the same game. For example the different series can relate to different retailers or to different geographical locations where the tickets are to be sold. The different series allow the game to create separate short runs of tickets using the same game but tailored to the required graphics for individual customers. If the tickets were destined for different retailers then the changes in the graphics or game information would be made either at the point where the books within the row are separated or are variably printed across the web. Retailers receive and sell tickets by book with every ticket in a book going to the same retailer. In FIG. 3 the separation would occur between 102 and 103.

The ability to print the game data in color using the variable image system allows yet further modifications and advantages.

Thus in a first example, there can be provided variably imaged legends within the game data. This allows:

multi coloured legends printing within game data area, more accurate registration of background legends to imaged data for example in Snakes and Ladders game style OR Battleship, more information within the game data area to player for more (complex) extended type play styles.

Thus in a second example, there can be provided free rotation of imaged game symbols relative to the ticket. Currently, imaged game symbols are orientated in right reading position relative to the ticket and current imaging technology make any level of rotation of the symbol very complicated and difficult. Thus the variable imaging printing system can be arranged to print the game data in any orientation relative to the ticket.

Thus in a third example, there can be provided the possibility for variably coloured tints in the game play areas.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of printing a row of game tickets where the tickets define:
    a ticket substrate having a front surface;
    game information printed on the front surface of the ticket substrate;
    a game area defined on the front surface;

game play data printed on the front surface in the game area;

the game play data being covered by at least one covering scratch-off layer which can be removed to be exposed by a player;

the method comprising:

providing the substrate in a continuous strip;

running the continuous strip through a printing line including a variable image printing system;

on the printing line, printing onto the substrate in the continuous strip for each ticket of the row of tickets the game play data using the variable image printing system so that the game play data of each ticket is different from the game play data of at least some other tickets in the row;

on the printing line, printing onto the substrate in the continuous strip for each ticket of the row of tickets the game information using the variable image printing system so that the game information of each ticket is different from the game information of at least some other tickets in the row;

wherein the game information and the game play data on the tickets are varied such that for at least one particular ticket of the row of tickets variations in the game information of said particular ticket are correlated to variations in the game play data on said particular ticket;

and controlling the variable image printing of the game information and the game play data of the tickets by a common control system of the printing line so that the game information and the game play data of each ticket are automatically correlated by the common control system;

wherein a sequential series of the tickets is printed where the tickets of the series have the game information thereof tied together as a sequential theme.

2. The method according to claim 1 wherein the game information and the game play data on each ticket are related such that a winning and losing status of the ticket is determined by using both data taken from the game play data of the ticket, which varies relative to other tickets, and data taken from the game information of the ticket, which varies relative to other tickets.

3. The method according to claim 1 wherein the game information and the game play data on each ticket are related by a common theme.

4. The method according to claim 1 wherein a series of tickets is printed where the game information of each ticket of the series is different with the different game information of the tickets being related by a common theme.

5. The method according to claim 1 wherein the theme is a series of numbers.

6. The method according to claim 1 wherein the sequential series of the tickets have also the game play data thereof tied together as a sequential theme.

7. The method according to claim 1 wherein the game information and the game play data form two separate distinct images with a discernible line therebetween and including controlling the variable image printing of the game information and the variable image printing of the game play data of the tickets by the common control system of the printing line so that there is no space between the image forming the game play data and the image forming the game information.

8. The method according to claim 1 wherein the game play data is printed not in full color and the game information is printed in full color.

9. The method according to claim 1 wherein the game play data uses the concept of a selected color of at least part of the game play data providing a bonus win.

10. The method according to claim 1 wherein the game play data is printed as a multi-colored image which covers all of the game area of each ticket.

11. The method according to claim 1 wherein the game play data is printed into a secure game area and includes benday lines printed between individual game elements of the game play data and wherein the benday lines of each ticket are different from the benday lines of at least some other tickets in the row and differences therebetween are not repeated in a discernible pattern.

12. The method according to claim 1 wherein the tickets are printed in a series relating to a single game and wherein the game information of some of the tickets is varied relative to the game information of others of the tickets so as to generate at least two separate series of tickets of the same game.

13. The method according to claim 1 wherein there are provided variably imaged legends printed within the game area which can be multi coloured.

14. The method according to claim 1 wherein there is provided additional information printed within the game area for providing information to the player for an extended play.

15. The method according to claim 1 wherein the game play data is printed so that the game symbols are rotated relative to the ticket.

16. The method according to claim 1 wherein the game play data is printed so that there are provided different coloured tints around the data in the game play areas.

17. A method of printing a row of game tickets where the tickets define:

a ticket substrate having a front surface;

game information printed on the front surface of the ticket substrate;

a game area defined on the front surface;

game play data printed on the front surface in the game area;

the game play data being covered by at least one covering scratch-off layer which can be removed to be exposed by a player;

the method comprising:

providing the substrate in a continuous strip;

running the continuous strip through a printing line including a variable image printing system;

on the printing line, printing onto the substrate in the continuous strip for each ticket of the row of tickets the game play data using the variable image printing system so that the game play data of each ticket is different from the game play data of at least some other tickets in the row;

on the printing line, printing onto the substrate in the continuous strip for each ticket of the row of tickets the game information at a position on the ticket separate from the game play data using the variable image printing system so that the game information of each ticket is different from the game information of at least some other tickets in the row;

wherein on each ticket the game play data is related to the game information by a common theme;

wherein a sequential series of the tickets each have said game information printed on the substrate of each of the tickets tied together as a sequential theme.

18. The method according to claim 17 wherein the theme is a series of numbers.

19. The method according to claim 17 wherein the sequential series of the tickets each have also the game play data thereof tied together as a sequential theme.

* * * * *